Patented Aug. 30, 1932

1,874,638

UNITED STATES PATENT OFFICE

KARL SCHRANZ AND CLEMENS LUTTER, OF WUPPERTAL/ELBERFELD, GERMANY, ASSIGNORS TO WINTHROP CHEMICAL COMPANY, INC., OF NEW YORK, N. Y., A CORPORATION OF NEW YORK

LITHIUM SALTS OF 7-IODO-8-HYDROXY QUINOLINE-5-SULFONIC ACIDS

No Drawing. Application filed June 27, 1931, Serial No. 547,454, and in Germany July 1, 1930.

The present invention relates to a new water-soluble derivative of the 7-iodo-8-hydroxyquinoline-5-sulfonic acid, more particularly it relates to the lithium salt of the said acid and to preparations yielding on the addition of water this lithium salt.

The sodium salt of 7-iodo-8-hydroxyquinoline-5-sulfonic acid hitherto used therapeutically possesses the drawback that it is only soluble in water to the extent of about 3%. In a similar manner the potassium salt or the other known metallic salts of 7-iodo-8-hydroxyquinoline-5-sulfonic acid, coming into consideration for therapeutic application, likewise display only low solubility in water.

In accordance with the present invention, by converting 7-iodo-8-hydroxyquinoline-5-sulfonic acid by the customary methods into the lithium salt or an aqueous solution thereof or by adding to the acid at least one equivalent of a lithium compound, which in the presence of water reacts with the acid to form the corresponding lithium salt, products are obtained which are eminently suited for the said purposes, since it has been established that they possess a high solubility in water. The neutral salt and the di-lithium salt thus obtainable dissolve in water to the extent of about 15%. The di-lithium salt wherein the second lithium atom is obviously linked to the oxygen atom of the hydroxy group, exerts a basic reaction.

As seen from the above statement, to obtain a product readily soluble in water, it is not necessary to employ the previously formed salt. The same action is displayed also by such preparations as contain, for each molecule of the 7-iodo-8-hydroxyquinoline-5-sulfonic acid, at least one equivalent of a lithium compound, which in the presence of water reacts with the acid in the known manner, for example, lithium hydroxide and lithium carbonate, to form the lithium salt. The production of 7-iodo-8-hydroxyquinoline-5-sulfonic acid preparations of increased solubility in water constitutes a noteworthy technical advance for the practical application thereof.

The invention is illustrated by the following examples without being restricted thereto.

Example 1

35.1 grams of 7-iodo-8-hydroxyquinoline-5-sulfonic acid are suspended in 100 cc. of water and dissolved by the addition of 3.7 grams of lithium carbonate. By evaporating this solution in vacuo at 30-40° C. the lithium salt of 7-iodo-8-hydroxyquinoline-5-sulfonic acid is obtained as a yellowish brown crystalline powder, which dissolves in water at room temperature to the extent of about 15%.

Example 2

To a suspension of 89.4 grams of the barium salt of 7-iodo-8-hydroxyquinoline-5-sulfonic acid in one liter of water at 40° C. a solution of 13.7 grams of lithium sulfate (mono-hydrate) in 500 grams of water is added. The solution is filtered from the separated barium sulfate and concentrated in vacuo to 430 cc. of liquid. This is, if necessary, filtered again from the last traces of barium sulfate and a 15% solution of the neutral lithium salt of 7-iodo-8-hydroxyquinoline-5-sulfonic acid is obtained. The solid salt can be isolated as described in Example 1.

Example 3

75 grams of 7-iodo-8-hydroxyquinoline-5-sulfonic acid, suspended in 500 cc. of water are dissolved by the addition of 6.5 grams of lithium oxide with shaking. By concentrating this solution in vacuo the di-lithium salt of 7-iodo-8-hydroxyquinoline-5-sulfonic acid is obtained, which displays a basic reaction, and is soluble in water to the extent of about 15%.

The same product is obtained when to a suspension of 37.5 grams of 7-iodo-8-hydroxyquinoline-5-sulfonic acid in 250 cc. of water 7.9 grams of lithium carbonate are added with stirring. When the evolution of carbon dioxide has ceased, a clear solution is obtained from which the reaction product can be isolated as above described.

Example 4

75 grams of 7-iodo-8-hydroxyquinoline-5-sulfonic acid are ground intimately with 7.9 grams of lithium carbonate in a mortar. Thus is obtained a light yellow powder; by dissolving this mixture in 430 cc. of water a 15% solution of the neutral lithium salt is obtained.

From the above it results that the effect of the present invention, to produce a derivative of the 7-iodo-8-hydroxyquinoline-5-sulfonic acid being readily soluble in water is achieved by the ready made lithium salt of the 7-iodo-8-hydroxyquinoline-5-sulfonic acid in the same manner as by those preparations containing in admixture the 7-iodo-7-hydroxyquinoline-5-sulfonic acid and a basic lithium compound and yielding with water solutions of the said lithium salt. The latter preparations behave, therefore, equivalent to the lithium salts themselves. For this reason in the following claims the term lithium salt of 7-iodo-8-hydroxyquinoline-5-sulfonic acid is intended to include also those preparations of 7-iodo-8-hydroxyquinoline-5-sulfonic acid which contain a basic lithium compound and dissolve in water with the formation of the said lithium salt.

We claim:—

1. As new products a lithium salt of 7-iodo-8-hydroxyquinoline-5-sulfonic acid containing at least one gram atom of lithium, being yellowish brown crystalline powders, being soluble in water of room temperature to the extent of about 15%.

2. As a new product the neutral mono-lithium salt of 7-iodo-8-hydroxyquinoline-5-sulfonic acid, being a yellowish brown crystalline powder, being soluble in water of room temperature to the extent of about 15%.

3. As a new product the basic di-lithium salt of 7-iodo-8-hydroxyquinoline-5-sulfonic acid, being a yellowish brown crystalline powder, being soluble in water of room temperature to the extent of about 15%.

In testimony whereof, we affix our signatures.

KARL SCHRANZ.
CLEMENS LUTTER.